United States Patent
Hiwatashi

[19]

[11] Patent Number: 6,056,374
[45] Date of Patent: May 2, 2000

[54] AUTOMATIC BRAKE CONTROL SYSTEM

[75] Inventor: Yutaka Hiwatashi, Tokyo, Japan

[73] Assignee: Fuji Jukogyo Kabushiki Kaisha, Tokyo, Japan

[21] Appl. No.: 09/260,930

[22] Filed: Mar. 2, 1999

[30]     Foreign Application Priority Data

Mar. 12, 1998  [JP]  Japan ................................. 10-061579

[51] Int. Cl.[7] ................................................. B60T 8/32
[52] U.S. Cl. ........................... 303/193; 303/192; 180/169
[58] Field of Search .................................. 303/192, 193; 180/169, 168, 167

[56]              References Cited

U.S. PATENT DOCUMENTS

| 5,332,056 | 7/1994 | Niibe et al. ............................. | 303/193 |
| 5,332,057 | 7/1994 | Butsuen et al. ......................... | 303/193 |
| 5,918,953 | 7/1999 | Nihei et al. ............................. | 303/192 |
| 5,931,547 | 8/1999 | Lerner ..................................... | 303/193 |

FOREIGN PATENT DOCUMENTS

| 4310354 | 10/1993 | Germany ............................. | 303/193 |
| 6144169 | 5/1994 | Japan . | |

*Primary Examiner*—Matthew C. Graham
*Attorney, Agent, or Firm*—Martin A. Farber

[57]             ABSTRACT

An automatic brake control system of a vehicle for automatically applying brake when said vehicle comes near to an obstacle ahead comprises an own vehicle speed detector for detecting a speed of the vehicle, a distance detector for detecting a distance between the own vehicle and the obstacle, an obstacle speed calculating device for calculating a speed of the obstacle based on the speed of the vehicle and the distance between the vehicle and the obstacle, a stop control judging device for making a comparison of the distance between the vehicle and the obstacle with a threshold distance, a target deceleration establishing apparatus based on the comparison for establishing a target deceleration to a first deceleration when the distance is smaller than the threshold distance and to a second deceleration when the distance is larger than the threshold distance and a brake drive controller for performing a deceleration control so as to generate a brake fluid pressure corresponding to the target deceleration in a brake drive apparatus.

7 Claims, 6 Drawing Sheets

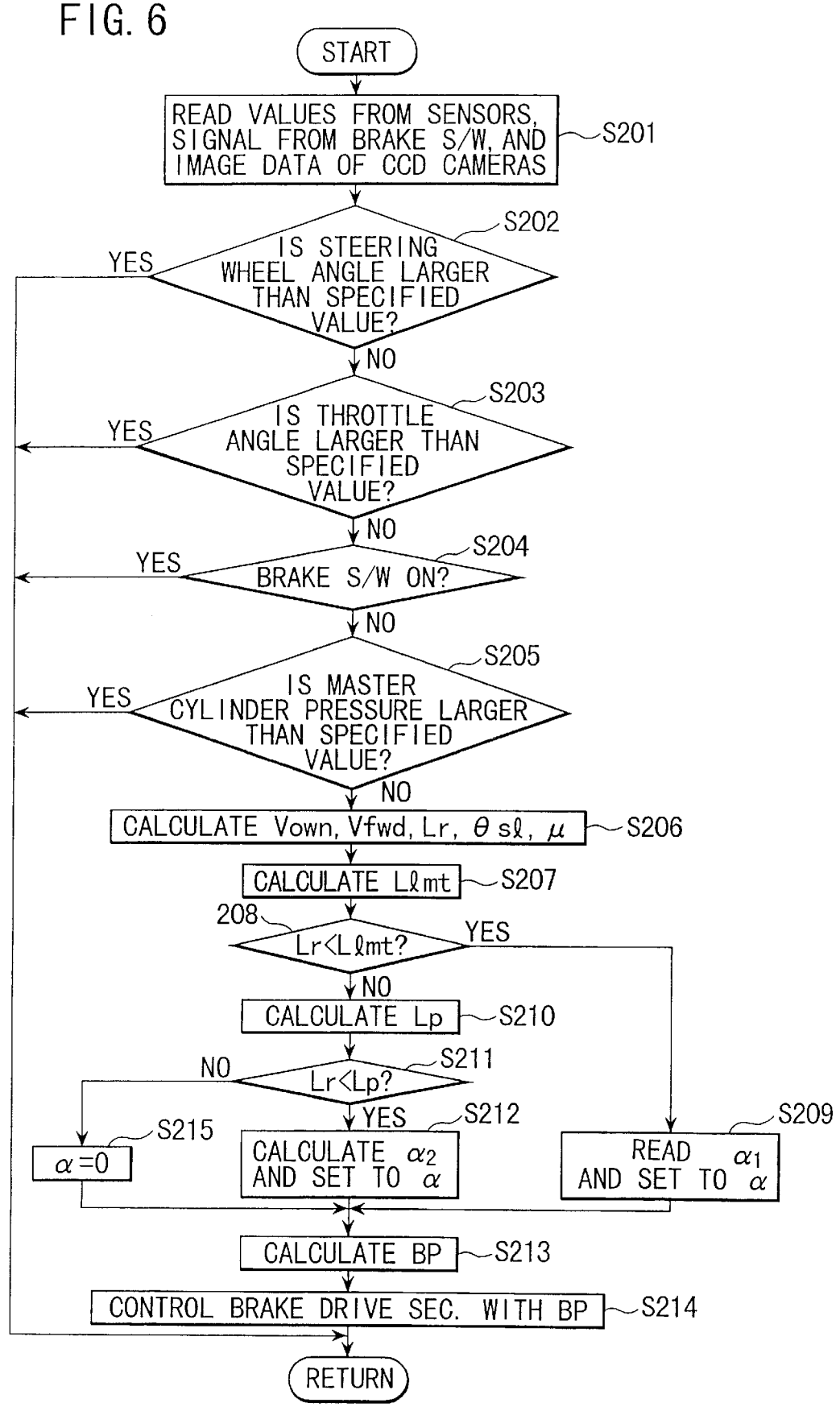

AUTOMATIC BRAKE CONTROL SYSTEM

BACKGROUND OF THE INVENTION

1. Field of the Invention

The present invention relates to an automatic brake control system for a vehicle in which brake is automatically applied when the vehicle comes close to an obstacle or a vehicle running ahead.

2. Prior Arts

In recent years, systems for avoiding a collision with an obstacle or a preceding vehicle presenting ahead of a vehicle have been developed. Such systems, for example an automatic brake control system includes an intervehicle distance detecting apparatus for detecting a distance between the vehicle and the preceding vehicle based on images taken by cameras, signals from a laser-beam radar or the like and an automatic brake apparatus for applying brake to the vehicle when the intervehicle distance becomes smaller than a threshold distance.

In most cases, such a threshold distance is calculated based on parameters such as a vehicle speed of an own vehicle, a vehicle speed of a preceding vehicle, an assumed deceleration of the own vehicle, an assumed deceleration of the preceding vehicle and the like. For example, Japanese Patent Application Laid-open No. Toku-Kai-Hei 6-144169 discloses a technique in which the threshold distance is calculated from a road friction coefficient, a measured intervehicle distance, vehicle speeds, a maximum deceleration to be produced with the road friction coefficient and a time-versus differential value of the intervehicle distance.

Further, in most cases, such a target deceleration is calculated based on parameters such as a vehicle speed of the own vehicle, a vehicle speed of the preceding vehicle and an intervehicle distance actually detected.

However, generally a vehicle speed sensor for detecting the vehicle speed of the own vehicle, particularly a vehicle speed sensor in which a vehicle speed is calculated from a wheel speed, has a defect that an extremely low speed, i.e., 2 to 3 km/hour, is difficult to be detected accurately. As a result, a traveling speed of an obstacle (in this case, preceding vehicle) is unable to be calculated accurately, because it is calculated based on the speed of the own vehicle and the intervehicle distance.

Therefore, when the vehicle travels at extremely low speeds, if the threshold distance and the target deceleration are calculated based on the own vehicle speed and the preceding vehicle speed, there is a fear that those threshold distance and target deceleration can not be established accurately and as a result the automatic brake control system does not operate properly.

Further, under the condition that the vehicle is very close to the preceding vehicle, an error in the intervehicle distance detected by the distance sensor can not be neglected. Especially when the vehicle is in the state of almost stopping, the target deceleration produces a large error and as a result, for example, when it is established to an unduly low value, such failures as the braking force is released immediately before stopping may occur.

SUMMARY OF THE INVENTION

With this problem of the prior art in mind, it is an object of the present invention to provide a reliable automatic brake control system capable of surely stopping the vehicle before an obstacle, even when the own vehicle travels at very low speeds. To attain the object, according to the present invention, the automatic brake control system comprises an own vehicle speed detecting means for detecting a speed of an own vehicle, a distance detecting means for detecting a distance between the own vehicle and an obstacle, an obstacle speed calculating means for calculating a speed of the obstacle based on the own vehicle speed and the distance between the own vehicle and the obstacle, a stop control judging means for making a comparison of the distance between the own vehicle and the obstacle with a threshold distance, a target deceleration establishing means based on the comparison for establishing a target deceleration to a first deceleration when the distance is smaller than the threshold distance and to a second deceleration when the distance is larger than the threshold distance, and a brake drive controlling means for performing a deceleration control so as to generate a brake fluid pressure corresponding to the target deceleration in a brake drive apparatus.

BRIEF DESCRIPTION OF THE DRAWINGS

FIG. 6 is a flowchart of a brake control according to a second embodiment of the present invention.

DETAILED DESCRIPTION OF THE PREFERRED EMBODIMENTS

Figure 2:
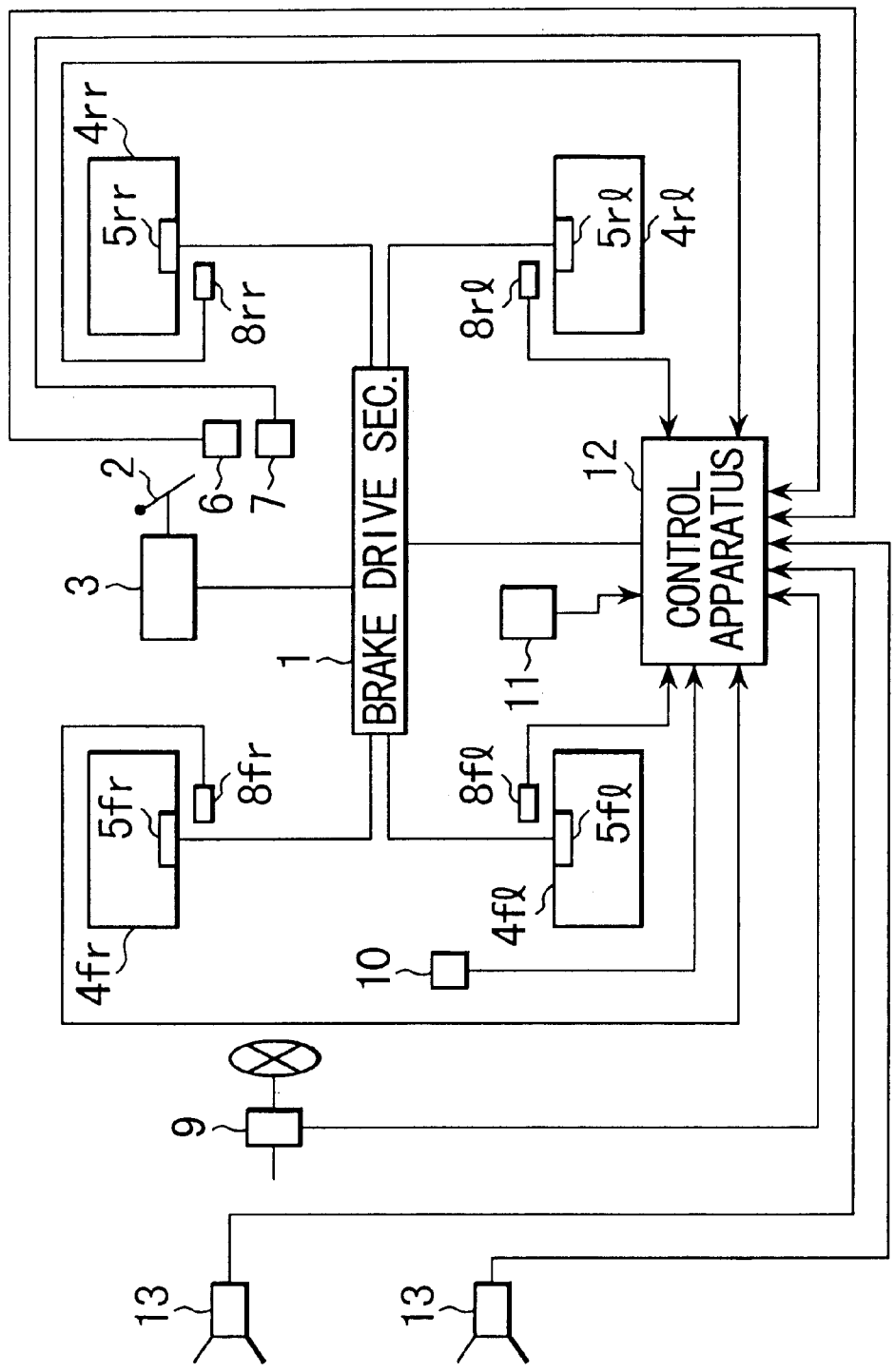
FIG. 2 is a skeleton diagram of an automatic brake control system mounted on a vehicle according to a first embodiment of the present invention.

Referring now to FIG. 2, reference numeral 1 denotes a brake drive section to which a master cylinder 3 are connected. The master cylinder 3 is interconnected with a brake pedal 2 which is operative by a vehicle driver. When the vehicle driver depresses the brake pedal 2, brake pressure is supplied from the master cylinder 3 to each of wheel cylinders, $5_{fl}$ for a left front wheel $4_{fl}$, $5_{fr}$ for a right front wheel $4_{fr}$, $5_{rl}$ for a left rear wheel $4_{rl}$, $5_{rr}$ for a right rear wheel $4_{rr}$ through the brake drive section 1 to apply brakes to four wheels.

The brake drive section 1 is of a hydraulic unit comprising a pressure source, pressure reducing valves, pressure increasing valves for feeding a brake pressure independently to the respective wheel cylinders, $5_{fl}$, $5_{fr}$, $5_{rl}$ and $5_{rr}$, according to input signals.

In the vicinity of the brake pedal 2, there is provided with a brake switch 6 which is turned on or off at a specified depression amount of the brake pedal 2. Further, the master cylinder 3 is provided with a pressure sensor 7 for detecting a brake pressure of the master cylinder 3.

The four wheels, $4_{fl}$, $4_{fr}$, $4_{rl}$, $4_{rr}$ have a left front wheel speed sensor $8_{fl}$, a right front wheel speed sensor $8_{fr}$, a left rear wheel speed sensor $8_{rl}$ and a right rear wheel speed sensor $8_{rr}$, respectively. Further, a steering wheel rotation angle sensor 9 is disposed at a steering column to detect a steering wheel rotation angle and a throttle body of an engine has a throttle opening angle sensor 10 for detecting an opening angle of a throttle valve.

Further, the vehicle has a longitudinal acceleration sensor 11 for detecting a longitudinal acceleration $G_x$ of the own vehicle. Further, the brake switch 6, the pressure sensor 7, the wheel speed sensors 8 ($8_{fl}$ through $8_{rr}$), the steering wheel rotation angle sensor 9, the throttle opening angle sensor 10 and the longitudinal acceleration sensor 11, are connected with a control apparatus 12 respectively.

Further, a pair of CCD (Charge Coupled Device) cameras is disposed at a frontal ceiling of the passenger compartment of the vehicle in a horizontally aligned relation at a prescribed distance away from each other. Also, the CCD cameras are connected with the control apparatus 12.

The control apparatus 12, when the brake control condition is satisfied by the miscellaneous signals inputted thereto, establishes a first deceleration as a target deceleration in case where the distance between the vehicle and an obstacle ahead is smaller than a threshold distance and a second deceleration is established as the target deceleration in case where the distance between the vehicle and the obstacle is larger than the threshold distance. Thus established target deceleration is inputted to the brake drive section 1.

Figure 1:
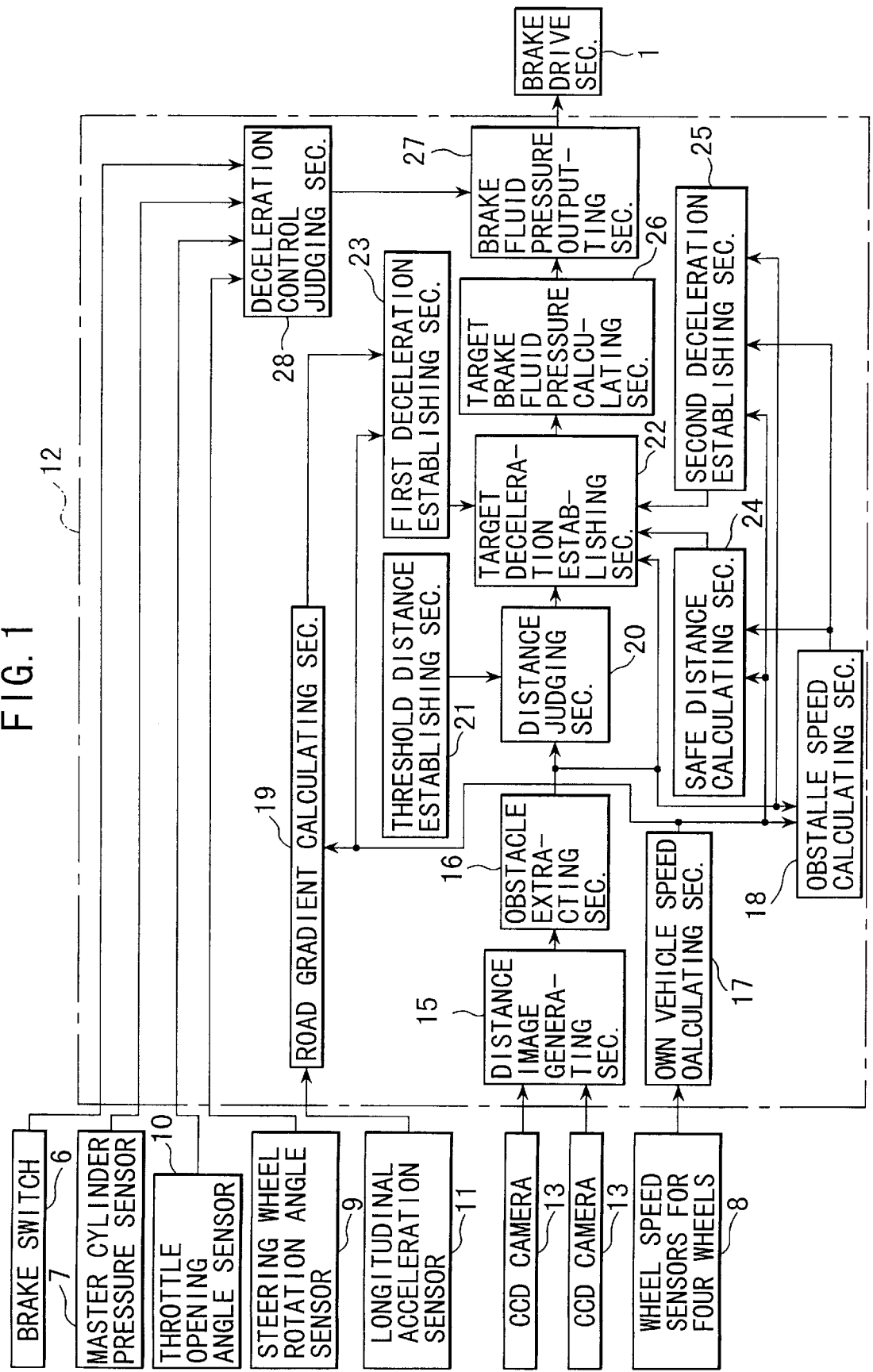
FIG. 1 is a functional block diagram of an automatic brake control system according to a first embodiment of the present invention.

The control apparatus 12, as shown in FIG. 1, comprises a distance image generating section 15, an obstacle extracting section 16, an own vehicle speed calculating section 17, an obstacle speed calculating section 18, a road gradient calculating section 19, a distance judging section 20, a threshold distance establishing section 21, a target deceleration establishing section 22, a first deceleration establishing section 23, a safe distance calculating section 24, a second deceleration establishing section 25, a target brake fluid pressure calculating section 26, a brake fluid pressure outputting section 27 and a deceleration control judging section 28.

The distance image generating section 15 processes a pair of images taken by the CCD cameras to obtain a distance information overall an image using the principle of triangulation and based on the distance information generates a distance image showing a three-dimensional distance distribution. Thus generated distance image is outputted to the obstacle extracting section 16.

The obstacle extracting section 16 extracts a box-like configuration from the distance image to recognize it as an obstacle presenting ahead of the own vehicle, outputting the distance $L_r$ to the object to the obstacle speed calculating section 18, the distance judging section 20, the target deceleration establishing section 22 and the second deceleration establishing section 25, respectively.

Thus, the CCD cameras 13, the distance image generating section 15 and the obstacle extracting section 16 constitute a distance detecting means for detecting the distance $L_r$ between the own vehicle and the obstacle ahead.

The own vehicle speed calculating section 17 calculates wheel speeds of the respective wheels based on signals from the wheel speed sensors 8 and obtains a vehicle speed $V_{own}$ of the own vehicle based on the wheel speeds (for example, based on a mean value of the respective wheel speeds). The vehicle speed obtained is outputted to the obstacle speed calculating section 18, the road gradient calculating section 19, the first deceleration establishing section 23, the safe distance calculating section 24 and the second deceleration establishing section 25.

Thus, the wheel speed sensors 8 and the vehicle speed calculating section 17 form an own vehicle speed detecting means.

When the distance $L_r$ to the obstacle ahead and the vehicle speed $V_{own}$ are inputted from the obstacle extracting section 16 and the own vehicle speed calculating section 17, respectively, the obstacle speed calculating section 18 calculates an obstacle speed $V_{fwd}$ from the summation of the time-versus differential of the distance $L_r$ and the own vehicle speed $V_{own}$. Thus obtained obstacle speed $V_{fwd}$ is outputted to the safe distance calculating section 24 and the second deceleration establishing section 25, respectively.

The road gradient calculating section 19 calculates a road gradient $\theta_{SL}$ based on the longitudinal acceleration $G_x$ and the own vehicle speed $V_{own}$ inputted from the longitudinal acceleration sensor 11 and the own vehicle speed calculating section 17, respectively and outputs the road gradient $\theta_{SL}$ to the first deceleration establishing section 23.

Specifically, the road gradient is calculated according to the following equation (1):

$$\theta_{SL}=(G_x-\delta/g)/100 \tag{1}$$

where $\theta_{SL}$ is a road gradient in %, $G_x$ is a longitudinal acceleration in meter/second$^2$(m/s$^2$), $\delta$ is a rate of change of vehicle speed of the own vehicle in m/s$^2$, and g is gravitational acceleration in m/s$^2$.

Further, the road gradient $\theta_{SL}$ may be calculated using the following equation (1)':

$$\theta_{SL} = \tan(\sin^{-1}((((T_e \cdot r_t \cdot i \cdot r_f / R_t) - F)/m - \delta)/g)) \cdot 100 \tag{1'}$$
$$\cong (((T_e \cdot r_t \cdot i \cdot r_f / R_t) - F)/m - \delta)/g) \cdot 100$$

where $T_e$ is an engine torque in Newton-meter, $r_t$ is a torque ratio of torque converter in case of a vehicle equipped with an automatic transmission, i is a transmission gear ratio, $r_f$ is a final reduction gear ratio, $R_t$ is a tire radius in meter, F is running resistance in Newton, m is a vehicle mass in kg, $\delta$ is a rate of change of vehicle speed of the self vehicle in m/s$^2$ and g is gravitational acceleration in m/s$^2$.

Further, the road gradient $\theta_{SL}$ may be obtained in other ways like using altitude data from a navigation system mounted on the vehicle or using data of the road configuration in picture image taken by CCD cameras.

The distance judging section 20 forms a stop control judging means for judging whether or not the vehicle should stop by comparing a threshold distance $L_{lmt}$ inputted from the threshold distance establishing section 21 with the distance $L_r$ inputted from the obstacle extracting section 16. The result of the judgment in the distance judging section 20, that is, the result of the comparison is outputted to the target deceleration establishing section 22.

The threshold distance $L_{lmt}$ is a value which has been obtained by experiments, calculations and the like and is memorized beforehand in the threshold distance establishing section 21 so as to be read out whenever it is necessary.

When the distance judging section 20 judges that the distance $L_r$ to the obstacle ahead is smaller than the threshold distance $L_{lmt}$ (when the own vehicle comes close to the obstacle ahead), the first deceleration establishing section 23 calculates a first deceleration $\alpha_1$ and the target deceleration establishing section 22 establishes the target deceleration $\alpha$ at the first deceleration $\alpha_1$. On the other hand, when the distance judging section 20 judges that the distance $L_r$ is larger than the threshold distance $L_{lmt}$ (when the own vehicle is apart from the obstacle ahead), the safe distance calculating section 24 calculates a safe distance $L_p$ based on the distance $L_r$ to the obstacle. Then, if the distance $L_r$ is smaller than the safe distance $L_p$ (the own vehicle comes close to the obstacle ahead), the second deceleration establishing section 25 calculates a second deceleration $\alpha_2$ and the target deceleration establishing section 22 establishes the target deceleration α at the second deceleration $\alpha_2$. Further, if the distance $L_p$ is larger than the safe distance $L_p$, the target deceleration α is established to be zero (α=0).

Thus established target deceleration α is outputted to the target brake fluid pressure calculating section 26.

The first deceleration establishing section 23 receives the own vehicle speed $V_{own}$ and the road gradient $\theta_{SL}$ from the own vehicle speed calculating section 17 and the road gradient calculating section 19, respectively and establishes the first deceleration $\alpha_1$ based on these vehicle speed $V_{own}$ and road gradient $\theta_{SL}$. This first deceleration $\alpha_1$ is read out by the target deceleration establishing section 22 when it is needed.

Specifically, the first deceleration $\alpha_1$ is established at a larger value as the own vehicle speed $V_{own}$ is high. This can be understood from the fact that in order to stop the vehicle with the same stopping distance a larger deceleration is needed as the vehicle speed of the own vehicle becomes high. Further, the first deceleration $\alpha_1$ is established at a relatively large value in case of an up-grade and it is established at a relatively small value in case of a down-grade. Thus, in this embodiment, the first deceleration $\alpha_1$ is established according to the own vehicle speed $V_{own}$ and the road gradient $\theta_{SL}$. In an alternative way, the first deceleration $\alpha_1$ may be established depending only upon either of the own vehicle speed $V_{own}$ and the road gradient $\theta_{SL}$.

The safe distance calculating section 24 receives the own vehicle speed $V_{own}$ and the obstacle speed $V_{fwd}$ from the own vehicle speed calculating section 17 and the obstacle speed calculating section 18, respectively and calculates the safe distance $L_p$ for example according to the following equation (2):

$$L_p = 0.5 \cdot (V_{fwd}^2 / 12.96) / (g_{fwd} \cdot g) - 0.5 \cdot (V_{own}^2 / 12.96) / (g_{own} \cdot g) + (V_{own} / 3.6) \cdot t_b + d_L \quad (2)$$

where $L_p$ is a safe distance in meter, namely a distance within which a possibility of collision rapidly increases; $V_{fwd}$ is a traveling speed of an obstacle in km/h; $V_{own}$ is a traveling speed of the own vehicle in km/h; $g_{own}$ is a maximum deceleration of the own vehicle in gravitational acceleration; $g_{fwd}$ is an estimated deceleration of the obstacle in gravitational acceleration; $t_b$ is a dead time in second and $d_L$ is a leeway before the obstacle in meter.

The safe distance $L_p$ is read out by the target deceleration establishing section 22 when needed.

The second deceleration establishing section 25 receives the distance $L_r$ to the obstacle ahead from the obstacle extracting section 16, the own vehicle speed $V_{own}$ from the own vehicle speed calculating section 17 and the obstacle speed $V_{fwd}$ from the obstacle speed calculating section 18 and calculates the second deceleration $\alpha_2$ for example according to the following equation (3).

$$\alpha_2 = (-0.5 \cdot ((V_{fwd}/3.6)^2 - (V_{own}/3.6)^2) / (d_L - L_r + (V_{own}/3.6) \cdot t_b)) / g \quad (3)$$

The calculated second deceleration $\alpha_2$ is read out by the target deceleration establishing section 22 when needed.

Thus, a target deceleration establishing means is formed by the target deceleration establishing section 22, the first deceleration establishing section 23, the safe distance calculating section 24 and the second deceleration establishing section 25.

The prior art in which a target deceleration is established at least in accordance with the own vehicle speed when it is judged that the own vehicle comes closer to an obstacle ahead than a threshold value, has a defect that the control is affected by an error in detecting the own vehicle speed and an error in measuring the distance between the own vehicle and the obstacle. According to the automatic brake control system of the first embodiment, this defect of the prior art is eliminated by establishing the target deceleration over two stages, the first deceleration $\alpha_1$ and the second deceleration $\alpha_2$. The first deceleration $\alpha_1$ is established when the own vehicle comes closer to the obstacle than the threshold distance $L_{lmt}$. The second deceleration $\alpha_2$ is established when the own vehicle is apart from the obstacle by more than the threshold distance $L_{lmt}$ and comes within the safe distance $L_p$. Due to the decelerations established in two-stages, even when the own vehicle travels at very low speeds, the automatic brake control surely operates to stop the vehicle.

The target brake fluid pressure calculating section 26 calculates a target brake fluid pressure BP (bar) for realizing the target deceleration α inputted from the target deceleration establishing section 22 and outputs it to the brake fluid pressure outputting section 27.

A braking force B is expressed in the following equation (4):

$$B = m \cdot \alpha \quad (4)$$

where B is a braking force to be applied to four wheels in N (Newton); m is a vehicle mass in kg and α is a deceleration in m/s².

Further, braking torques are:

$$T_f = K_f \cdot BP \quad (5)$$

$$T_r = K_r \cdot BP \quad (6)$$

A total braking torque is:

$$T = 2 \cdot T_f + 2 \cdot T_r \quad (7)$$

A total braking force is:

$$B = T/RT \quad (8)$$

where $T_f$ is a braking torque for a front wheel; $T_r$ is a braking torque for a rear wheel in N·m; $K_f$ is a brake characteristic coefficient for front wheels in N·m/bar; $K_r$ is a brake characteristic coefficient for rear wheels in N·m/bar; BP is a brake fluid pressure in bar; T is a total braking torque in N·m; B is a total braking force in N (Newton); and RT is a tire radius in m (meter).

Then, using the equations (4), (5), (6), (7) and (8), a brake pressure BP for attaining the total braking force B is calculated according to the following equation.

$$BP = 0.5 \cdot (B \cdot RT) / (K_f + K_r) \quad (9)$$
$$= 0.5 \cdot (m \cdot \alpha \cdot RT) / (K_f + K_r)$$

The brake fluid pressure outputting section 27 receives a signal to release the automatic brake control from the deceleration control judging section 28 and the target brake fluid pressure BP from the target brake fluid pressure calculating section 26. When the signal for releasing the automatic brake control is inputted from the deceleration control judging section 28, no automatic brake control is executed to the brake drive section 1. On the other hand, when the target brake fluid pressure BP is inputted from the target brake fluid pressure calculating section 26, the brake fluid pressure outputting section 27 controls the brake drive section 1 so as to agree with the target brake fluid pressure BP.

The deceleration control judging section 28 receives ON/OFF signals of the braking operation of the brake pedal 2 from the brake switch 6, a signal indicative of the master cylinder pressure from the master cylinder pressure sensor 7, a signal indicative of the steering wheel rotation angle from the steering wheel rotation angle sensor 9 and a signal indicative of the throttle opening angle from the throttle opening angle sensor 10, respectively and based on these signals it outputs a signal to execute or release the automatic brake control to the bake fluid pressure outputting section 27.

That is, when the brake switch 6 is turned ON, since this is a case where the vehicle driver has an obvious intention to decrease the vehicle speed or to stop the vehicle, the deceleration control judging section 28 makes such a judgment as releasing the automatic brake control so as to avoid interference thereof.

Further, when the master cylinder pressure outputted from the master cylinder pressure sensor 7 exceeds a specified value, since vehicle driver has an intention to decrease the vehicle speed or to stop the vehicle in the same manner as in the case of the brake switch 6 turned on, the automatic brake control is required to be released to avoid interference thereof. The automatic brake control may be released only when the depression of the brake pedal 2 produces a deceleration larger than a specified value, the target deceleration α for example, thereby a sudden drop of the braking force when the automatic brake control is released by the brake switch 6, can be prevented.

Further, when the steering wheel rotation angle sensed by the steering wheel rotation angle sensor 9 exceeds a prescribed value, sometimes an object located along a curve is detected as an obstacle. In this case, since it is not desirable to operate the automatic brake control, the deceleration control judging section 28 makes a judgment of releasing the automatic brake control.

Further, when the throttle opening angle detected by the throttle opening angle sensor 10 exceeds a prescribed value, this indicates that the driver intentionally accelerates the vehicle towards an obstacle ahead, for example, he passes a vehicle traveling ahead of the own vehicle. In this case, the deceleration control judging section 28 makes a judgment of releasing the automatic brake control in order to prevent a braking operation of the automatic brake control. In other ways of judging a driver's intention to accelerate the vehicle, the detection of the ON-OFF operation of the accelerator pedal or the direct detection of the vehicle acceleration may be introduced.

Thus, the brake switch 6, the master cylinder pressure sensor 7, the steering wheel rotation angle sensor 9 and the throttle opening angle sensor 10 constitute a driving operation detecting means for detecting a driving operation changing a relative distance between the own vehicle and the obstacle ahead.

Further, the target brake fluid pressure calculating section 26, the brake fluid pressure outputting section 27 and the deceleration control judging section 28 form a brake drive controlling means.

Figure 3:
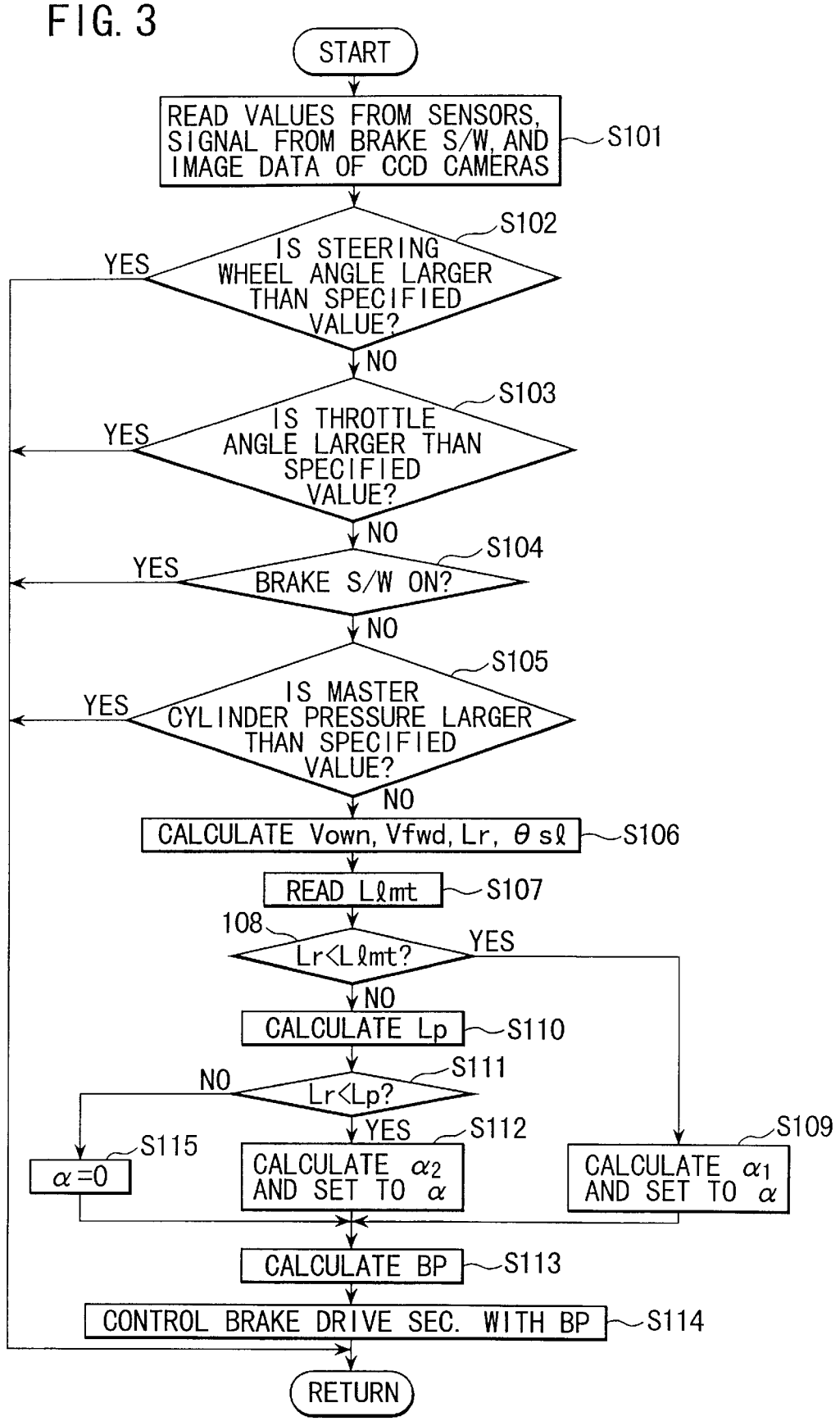
FIG. 3 is a flowchart of a brake control according to a first embodiment of the present invention.

Next, an operation of the first embodiment will be described with reference to a flowchart shown in FIG. 3.

When the program of the automatic brake control starts, first at a step (hereinafter, referred to as S) 101, values of miscellaneous sensors (master cylinder pressure of the master cylinder pressure sensor 7, respective wheel speeds of wheel speed sensors 8, steering wheel rotation angle of the steering wheel rotation angle sensor 9, throttle opening angle of the throttle opening angle sensor 10 and longitudinal acceleration $G_x$ of the longitudinal acceleration sensor 11), ON-OFF signals of the brake switch 6 and data of image signals of a pair of CCD cameras, are read.

Then, the program goes to S102 where it is judged whether or not the steering wheel rotation angle is larger than a specified value. If it is larger than the specified value, the own vehicle is making a turn and as a result an obstacle is detected ahead. At this moment, since the automatic brake control is erroneously operated, the program leaves the routine to release the automatic brake control.

On the other hand, if the steering wheel rotation angle is smaller than the specified value, it is understood that the own vehicle is substantially going straight. Then, the program goes to S103 where it is judged whether or not the throttle opening angle is larger than a specified value. If it is larger than the specified value, the own vehicle is accelerating and therefore it is necessary to avoid interference of the automatic brake control. Thus, the program leaves the routine to release the automatic brake control.

At S103, if the throttle opening angle is smaller than the specified value, that is, if the own vehicle is not accelerated, the program goes to S104 where it is judged whether or not the brake switch 6 is turned on, namely, brake is applied to the own vehicle. If the brake switch 6 is turned ON, since the brake operation has been performed on the own vehicle, it is necessary to avoid interference of the automatic brake control, the program leaving the routine to release the automatic brake control.

When it is judged at S104 that the brake switch 6 is turned OFF and therefore no brake is applied to the own vehicle, the program goes to S105 where it is judged whether or not the master cylinder pressure is larger than a specified value. If the master cylinder pressure is larger than the specified value, even if the brake switch is turned OFF, it is judged that the automatic brake is operated and the program leaves the routine to release the automatic brake control.

That is, the steps S102 through S105 are processes to be executed in the deceleration control judging section 28 of the control apparatus 12. The process at S105 is for backing-up the process at S104 and therefore, if S105 comes after S104, the order of other processes may be changed.

In case where it is judged at S105 that the master cylinder pressure is smaller than the specified value, namely, in case where it is judged that no brake is applied to the own vehicle, the program goes to S106 where the own vehicle speed $V_{own}$, the obstacle speed $V_{fwd}$, the distance $L_r$ to the obstacle and the road gradient $\theta_{SL}$ are calculated in the own vehicle speed calculating section 17, the obstacle speed calculating section 18, the obstacle extracting section 16 and the road gradient calculating section 19, respectively.

Next, the program goes to S107, in which the threshold distance $L_{lmt}$ stored in the threshold distance establishing section 21 is read out and then at S108 the distance $L_r$ to the obstacle is compared with the threshold distance $L_{lmt}$ in the distance judging section 20.

As a result of the comparison at S108, when the distance $L_r$ to the obstacle is smaller than the threshold distance $L_{lmt}$, that is, when the own vehicle comes closer to the obstacle than the threshold distance $L_{lmt}$, the program goes to S109 where the first deceleration $\alpha_1$ is calculated according to the own vehicle speed $V_{own}$ and the road gradient $\theta_{SL}$ and after the first deceleration $\alpha_1$ is set to the target deceleration α, the program goes to S113.

On the other hand, as a result of the comparison at S108, when the distance $L_r$ to the obstacle is larger than the threshold distance $L_{lmt}$, that is, when the own vehicle is apart from the obstacle by more than the threshold distance $L_{lmt}$, the program goes to S110 where the safe distance $L_p$ is calculated according to the equation (2) and then goes to S111.

At S111, the distance $L_r$ to the obstacle is compared with the safe distance $L_p$. If the distance $L_r$ is smaller than the safe distance $L_p$, namely, if the own vehicle comes closer to the obstacle ahead than the safe distance $L_p$, the program goes to S112 where the second deceleration $\alpha_2$ is calculated according to the equation (3) and after the second deceleration $\alpha_2$ is set to the target deceleration $\alpha$, the program goes to S113.

At S111, if the distance $L_r$ is larger than the safe distance $L_p$, namely, if the own vehicle is apart from the obstacle ahead by more than the safe distance $L_p$, since there is no such obstacle ahead as needing brake, the program goes to S115 where the target deceleration $\alpha$ is established to be zero and then goes to S113.

After the target deceleration $\alpha$ is established at S109, S112 or S115, the program goes to S113 where the target brake fluid pressure BP is calculated according to the equation (9) and then goes to S114. At S114, the brake drive section 1 is controlled so as to produce a hydraulic pressure which agrees with the target brake fluid pressure BP and then the program leaves the routine.

Since the first deceleration $\alpha_1$ is established in consideration of the effect of the own vehicle speed $V_{own}$ and the road gradient $\theta_{SL}$, the automatic brake control system enables to make an accurate automatic brake control according to vehicle running conditions and road situations.

Further, since the execution or non-execution of the automatic brake control is judged based on the operation of the brake pedal, the steering wheel and the accelerator pedal, the vehicle can be prevented from coming into an awkward condition.

Next, the automatic brake control system according to the second embodiment will be described with reference to FIGS. 4 to 6. In the first embodiment, the threshold distance $L_{lmt}$ is a memorized predetermined value, but in the second embodiment, the threshold distance $L_{lmt}$ is established according to the own vehicle speed $V_{own}$, the road gradient $\theta_{SL}$ and the road friction coefficient $\mu$. Further, in the first embodiment, the first target deceleration $\alpha_1$ is established according to the own vehicle speed $V_{own}$ and the road gradient $\theta_{SL}$, but in the second embodiment, the first target deceleration $\alpha_1$ is a memorized predetermined value. Other constitutions and functions are similar to those in the first embodiment. Therefore, the same reference numerals have been attached to the sections having the same function.

Figure 5:
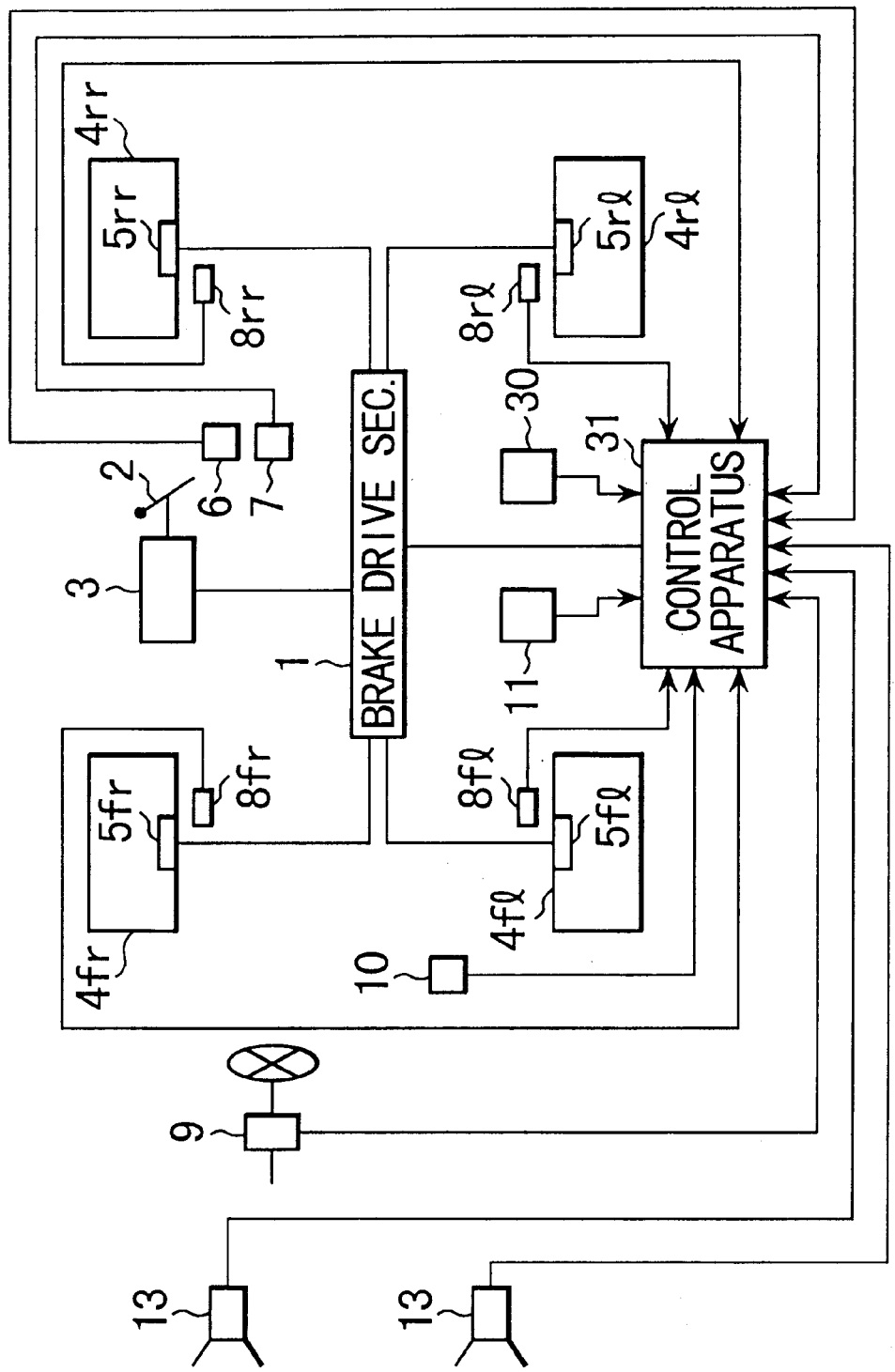
FIG. 5 is a skeleton diagram of an automatic brake control system mounted on a vehicle according to a second embodiment of the present invention.

FIG. 5 is a skeleton view of an automatic brake control system mounted on a vehicle, in which a yaw rate sensor 30 is; additionally equipped with the system according to the first embodiment. The yaw rate sensor 30 is connected with a control apparatus 31.

The control apparatus 31 equivalent to the control apparatus 12 of the first embodiment is connected with a brake switch 6, a master cylinder pressure sensor 7, wheel speed sensors 8, a steering wheel rotation angle sensor 9, a throttle opening angle sensor 10, a longitudinal acceleration sensor 11, a pair of CCD cameras 13 and a yaw rate sensor 30.

When an operating condition of the automatic brake control is satisfied based on respective input signals sent from these sensors, the brake drive section 1 is controlled so as to produce a brake fluid pressure equivalent to the target deceleration $\alpha$. The target deceleration $\alpha$ is established over two stages, a first deceleration $\alpha_1$ and a second deceleration $\alpha_2$, in the same manner as the first embodiment. The first deceleration $\alpha_1$ is established when the own vehicle comes closer to the obstacle than the threshold distance $L_{lmt}$. The second deceleration $\alpha_2$ is established when the own vehicle is apart from the obstacle by more than the threshold distance $L_{lmt}$ and comes within the safe distance $L_p$.

Figure 4:
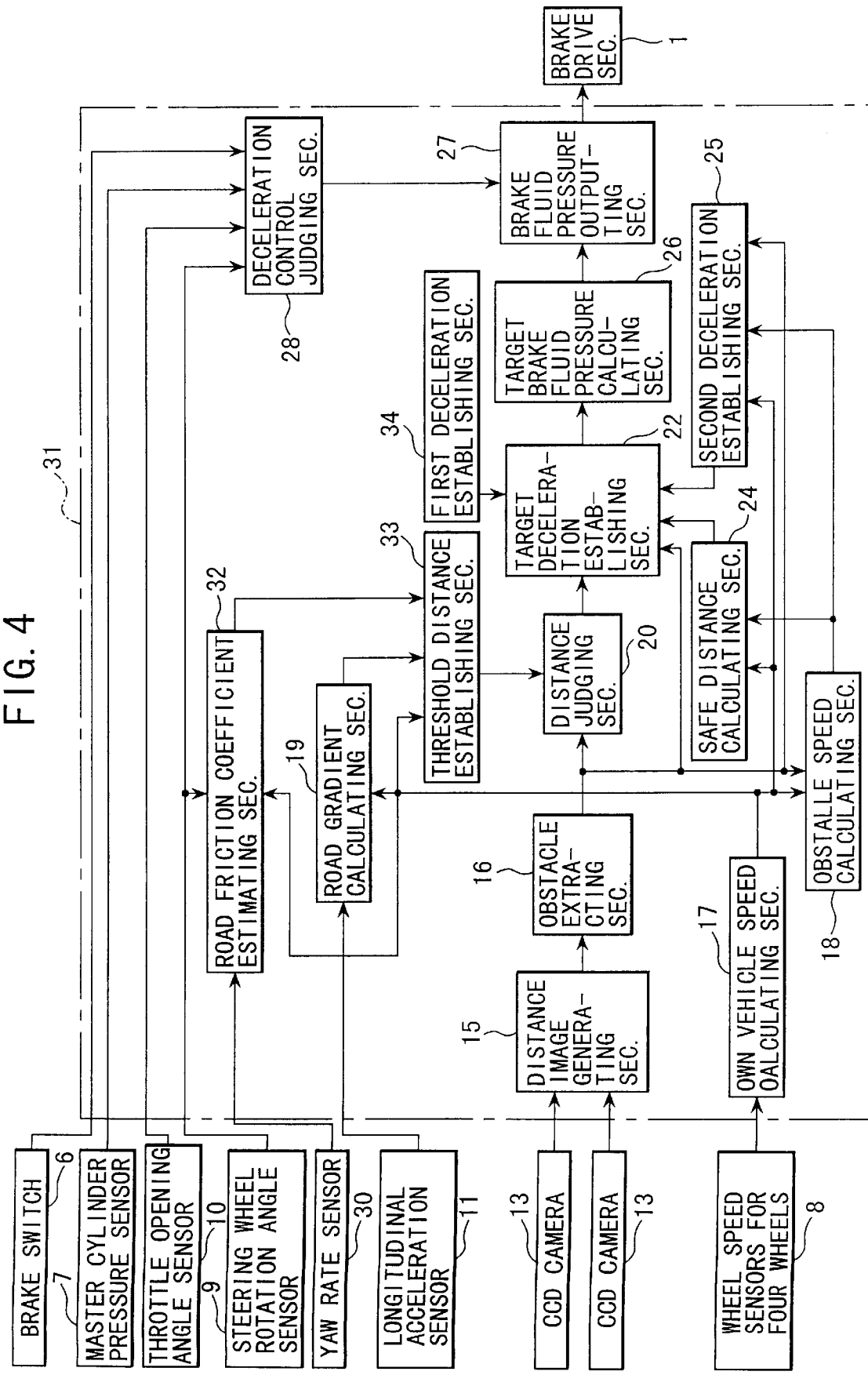
FIG. 4 is a functional block diagram of an automatic brake control system according to a second embodiment of the present invention.

The control apparatus 31, as shown in FIG. 4, comprises a distance image generating section 15, an obstacle extracting section 16, an own vehicle speed calculating section 17, an obstacle speed calculating section 18, a road gradient calculating section 19, a distance judging section 20, a target deceleration establishing section 22, a safe distance calculating section 24, a second deceleration establishing section 25, a target brake fluid pressure calculating section 26, a brake fluid pressure outputting section 27, a deceleration control judging section 28, a road friction coefficient estimating section 32, a threshold distance establishing section 33 and a first deceleration establishing section 34.

The road friction coefficient establishing section 32 calculates a road friction coefficient $\mu$ according to an estimation method, for example, proposed by the applicant of the present invention in Japanese Patent Application Laid-open No. Toku-Kai-Hei 8-2274. According to the proposed method, the road friction coefficient $\mu$ is calculated based on a steering wheel rotation angle detected by the steering wheel rotation angle sensor 9, a yaw rate detected by the yaw rate sensor 30 and an own vehicle speed $V_{own}$ calculated by the own vehicle speed calculating section 17.

More specifically, describing the calculation of a road friction coefficient, respective cornering powers of the front and rear wheels are estimated being extended to the non-linear region based on the equation of motion using a steering wheel rotation angle, a yaw rate and an own vehicle speed $V_{own}$. The road friction coefficient $\mu$ is estimated by taking the ratio of the estimated cornering power of the front and rear wheels to the equivalent cornering powers of the front and rear wheels on a road surface having a high friction coefficient (for example $\mu=1$) and is outputted to the threshold distance establishing section 33.

The threshold distance establishing section 33 which is equivalent to the threshold distance establishing section 21 in the first embodiment receives the own vehicle speed $V_{own}$ from the own vehicle speed calculating section 17, the road gradient $\theta_{SL}$ from the road gradient calculating section 19 and the road friction coefficient $\mu$ from the road friction coefficient estimating section 32, respectively and establishes the threshold distance $L_{lmt}$ based on these inputted data. This threshold distance $L_{lmt}$ is read out by the distance judging section 20 when it is needed.

The threshold distance $L_{lmt}$ is established to be relatively long as the own vehicle speed is higher. This is because when the vehicle speed is high, the target deceleration $\alpha$ must be large in order to obtain the same stopping distance and as the target deceleration $\alpha$ is larger, the rise of brake fluid pressure tends to retard. Further, in case of a downgrade, the threshold distance $L_{lmt}$ is established to be relatively long and in case of an up-grade, the threshold distance $L_{lmt}$ is established to be relatively short. Further, as the road friction coefficient $\mu$ is lower, the threshold distance $L_{lmt}$ is established to be relatively long and in case where the road friction coefficient $\mu$ is high, the threshold distance $L_{lmt}$ is established to be shorter than a reference distance obtained from calculation. Further, the establishment of the threshold distance $L_{lmt}$ may be obtained by multiplying a prescribed constant by a variable established according to the own vehicle speed $V_{own}$, the road gradient $\theta_{SL}$ and the road friction coefficient $\mu$ or may be obtained by referring to a map parameterizing the own vehicle speed $V_{own}$, the road gradient $\theta_{SL}$ and the road friction coefficient $\mu$. Further, in this embodiment, the threshold distance $L_{lmt}$ is established according to the own vehicle speed $V_{own}$, the road gradient $\theta_{SL}$ and the road friction coefficient $\mu$ but it may be established, depending upon vehicle grades, vehicle specifications or other conditions, according to at least either of these values, the own vehicle speed $V_{own}$, the road gradient $\theta_{SL}$ and the road friction coefficient $\mu$.

The first deceleration establishing section 34 which is equivalent to the first deceleration establishing section 23 in the first embodiment, stores a first deceleration $\alpha_1$ beforehand. The first deceleration $\alpha_1$ is a value that has been predetermined by experiments and the like and is read out by the target deceleration establishing section 22 when it is needed.

The prior art in which a target deceleration is established at least in accordance with the own vehicle speed when it is judged that the own vehicle comes closer to an obstacle ahead than a threshold value, has a defect that the control is affected by an error in detecting the own vehicle speed and an error in measuring the distance between the own vehicle and the obstacle. According to the automatic brake control system of the second embodiment, this defect of the prior art is deleted by establishing the target deceleration over two stages, the first deceleration $\alpha_1$ and the second deceleration $\alpha_2$. The first deceleration $\alpha_1$ is established when the own vehicle comes closer to the obstacle than the threshold distance $L_{lmt}$ which is established according to the own vehicle speed $V_{own}$, the road gradient $\theta_{SL}$ and the road friction coefficient $\mu$. The second deceleration $\alpha_2$ is established when the own vehicle is apart from the obstacle by more than the threshold distance $L_{lmt}$ and comes within the safe distance $L_p$. Due to the decelerations established in two-stages, even when the own vehicle travels at very low speeds, the automatic brake control surely operates to stop the vehicle.

Next, an operation of the second embodiment will be described with reference to a flowchart shown in FIG. 6.

When the automatic brake control program starts, first at S201 values of miscellaneous sensors (master cylinder pressure of the master cylinder pressure sensor 7, respective wheel speeds of wheel speed sensors 8, steering wheel rotation angle of the steering wheel rotation angle sensor 9, throttle opening angle of the throttle opening angle sensor 10 and longitudinal acceleration Gx of the longitudinal acceleration sensor 11), a yaw rate of the yaw rate sensor 30, ON-OFF signals of the brake switch 6 and data of image signals of a pair of CCD cameras, are read.

The processes at S202, S203, S204 and S205 are the same as those at S102, S103, S104 and S105 in the first embodiment and are performed in the deceleration control judging section 28.

That is, at S202 it is judged whether or not the steering wheel rotation angle is larger than a prescribed value. If it is larger than the prescribed value, the own vehicle is making a turn. In order to prevent an erroneous operation of the automatic brake control, the program leaves the routine to release the automatic brake control.

At S202, if the steering wheel rotation angle is smaller than the prescribed value, the program goes to S203 where it is judged whether or not the throttle opening angle is larger than a prescribed value. If it is larger than the prescribed value, the accelerating operation is being applied and therefore in order to avoid interference of the automatic brake control, the program leaves the routine to release the automatic brake control.

At S203, if the throttle opening angle is smaller than the prescribed value, the program goes to S204 where the brake switch 6 is turned ON or OFF. If the brake switch is turned ON, the decelerating operation is being applied and therefore in order to avoid interference of the automatic brake control, the program leaves the routine to release the automatic brake control.

At S204, when the brake switch 6 is turned OFF, the program goes to S205 where it is judged whether or not the master cylinder pressure is larger than a specified value. If the master cylinder pressure is larger than a prescribed value, the decelerating operation is being applied and therefore in order to prevent interference of the automatic brake control, the program leaves the routine to release the automatic brake control.

With respect to the processes S202 through S205, similarly to the first embodiment, the process at S205 is for backing-up the process at S204 and therefore, if S205 comes after S204, the order of other processes may be changed.

At S205, if the master cylinder pressure is smaller than the prescribed value, namely, the program goes to S206 where the own vehicle speed $V_{own}$, the obstacle speed $V_{fwd}$, the distance $L_r$ to the obstacle, the road gradient $\theta_{SL}$ and the road friction coefficient $\mu$ are calculated in the own vehicle speed calculating section 17, the obstacle speed calculating section 18, the obstacle extracting section 16, the road gradient calculating section 19 and the road friction coefficient estimating section 32, respectively.

Next, the program goes to S207, in which the threshold distance $L_{lmt}$ is calculated based on the own vehicle speed $V_{own}$, the road gradient $\theta_{SL}$ and the road friction coefficient $\mu$ in the threshold distance establishing section 33 and then at S208 the distance $L_r$ to the obstacle is compared with the threshold distance $L_{lmt}$ in the distance judging section 20.

As a result of the comparison at S208, when the distance $L_r$ to the obstacle is smaller than the threshold distance $L_{lmt}$, that is, when the own vehicle comes closer to the obstacle than the threshold distance $L_{lmt}$, the program goes to S209 where the target deceleration establishing section 22 reads out the first deceleration $\alpha_1$ from the first deceleration establishing section 34 and sets this first deceleration $\alpha_1$ to the target deceleration $\alpha$ and goes to S213.

On the other hand, as a result of the comparison at S208, when the distance $L_r$ to the obstacle is larger than the threshold distance $L_{lmt}$, that is, when the own vehicle is apart from the obstacle by more than the threshold distance $L_{lmt}$, the program goes to S210 where the safe distance calculating section 24 calculates the safe distance $L_p$ according to the equation (2) and the target deceleration establishing section 22 sets this safe distance $L_p$ then goes to S211.

At S211, the distance $L_r$ to the obstacle is compared with the safe distance $L_p$. If the distance $L_r$ is smaller than the safe distance $L_p$, namely, if the own vehicle comes closer to the obstacle ahead than the safe distance $L_p$, the program goes to S212 where the second deceleration establishing section 25 calculates the second deceleration $\alpha_2$ according to the equation (3) and the target deceleration establishing section 22 sets the second deceleration $\alpha_2$ to the target deceleration $\alpha$ and goes to S213.

At S211, if the distance $L_r$ is larger than the safe distance $L_p$, namely, if the own vehicle is apart from the obstacle ahead by more than the safe distance $L_p$, since there is no such obstacle ahead as needing brake, the program goes to S215 where the target deceleration establishing section 22 sets the target deceleration $\alpha$ to be zero and then goes to S213.

After the target deceleration $\alpha$ is established at S209, S212 or S215, the program goes to S213 where the target brake fluid pressure calculating section 26 calculates the target brake fluid pressure BP according to the equation (9) and then goes to S214. At S214, the brake fluid pressure outputting section, 27 controls the brake drive section 1 so as to produce a hydraulic pressure which agrees with the target brake fluid pressure BP and then the program leaves the routine.

Since the threshold distance $L_{lmt}$ is established in consideration of the own vehicle speed $V_{own}$, the road gradient $\theta_{SL}$ and the road friction coefficient $\mu$, the automatic brake control can be performed more properly according to the running condition and the road condition.

In case of the first embodiment, as described before, a value memorized beforehand in the threshold distance establishing section 21 is employed as the threshold distance $L_{lmt}$ and the first deceleration $\alpha_1$ is a value established according to the own vehicle speed $V_{own}$ and the road gradient $\theta_{SL}$ in the first deceleration establishing section 23. Further, in case of the second embodiment, it is different from ones of the first embodiment that a value established according to the own vehicle speed $V_{own}$, the road gradient $\theta_{SL}$ and the road friction coefficient $\mu$ in the threshold distance establishing section 33 is employed as the threshold distance $L_{lmt}$ and that the first deceleration $\alpha_1$ is a value memorized beforehand in the first deceleration establishing section 34. However, alternatively, both of the threshold distance $L_{lmt}$ and the first deceleration $\alpha_1$ may be memorized values. Further, alternatively, the threshold distance $L_{lmt}$ may be established according to at least either one of the own vehicle speed $V_{own}$, the road gradient $\theta_{SL}$ and the road friction coefficient $\mu$. Further, the first deceleration $\alpha_1$ may be established according to either one of the own vehicle speed $V_{own}$ and the road gradient $\theta_{SL}$. Further, the threshold distance $L_{lmt}$ and/or the first deceleration $\alpha_1$ may be a specified value which is independent of the own vehicle speed $V_{own}$, the road gradient $\theta_{SL}$, the road friction coefficient $\mu$ and the like.

Further, in the respective embodiments of the present invention, the distance $L_r$ to an obstacle ahead is obtained from the stereoscopic image taken by a pair of CCD cameras, however, in place of the CCD cameras, other apparatuses, for example, laser radar, may be employed.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An automatic brake control system of a vehicle for automatically applying brake when said vehicle comes near to an obstacle ahead, having wheels, wheel cylinders of said wheels, a steering wheel, a brake pedal, an accelerator pedal and a brake drive apparatus for generating a brake fluid pressure and feeding said brake fluid pressure to said wheel cylinders, comprising:

an own vehicle speed detecting means for detecting a speed of said vehicle;

a distance detecting means for detecting a distance between said vehicle and said obstacle;

an obstacle speed calculating means for calculating a speed of said obstacle based on said speed of said vehicle and said distance between said vehicle and said obstacle;

a stop control judging means for making a comparison of said distance between said vehicle and said obstacle with a threshold distance;

a first deceleration establishing means for establishing a first deceleration based on said vehicle speed and a road gradient;

a second deceleration establishing means for establishing a second deceleration based on said vehicle speed, said obstacle speed, and said distance between said vehicle and said obstacle;

a target deceleration establishing means based on said comparison for establishing a target deceleration at said first deceleration when said distance is smaller than said threshold distance and at said second deceleration when said distance is larger than said threshold distance; and a brake drive controlling means for performing a deceleration control so as to generate said brake fluid pressure corresponding to said target deceleration in said brake drive apparatus.

2. The automatic brake control system according to claim 1, wherein said system further has a driving operation detecting means for detecting a brake switch, a master cylinder pressure, a throttle opening angle, and a steering wheel rotation angle; and said brake drive controlling means cancels said deceleration control when at least one of said steering wheel, said brake pedal and said accelerator pedal is judged to be operated by more than a specified value according to said driving operation detecting means.

3. The automatic brake control system according to claim 1, wherein said threshold distance is a fixed value.

4. The automatic brake control system according to claim 1, wherein said threshold distance is a variable value which is varied according to at least one of said speed of said vehicle, said road gradient and a road friction coefficient.

5. The automatic brake control system according to claim 1, wherein said first deceleration is a fixed value.

6. The automatic brake control system according to claim 1, wherein said first deceleration is a variable value which is varied according to at least one of said speed of said vehicle and said road gradient.

7. The automatic brake control system according to claim 1, wherein said second deceleration is a variable value which is varied according to at least one of said distance between said vehicle and said obstacle, said speed of said vehicle and said speed of said obstacle.

* * * * *